Dec. 11, 1923.
J. H. TABLER
BELT FASTENER
Original Filed July 3, 1922
1,476,852
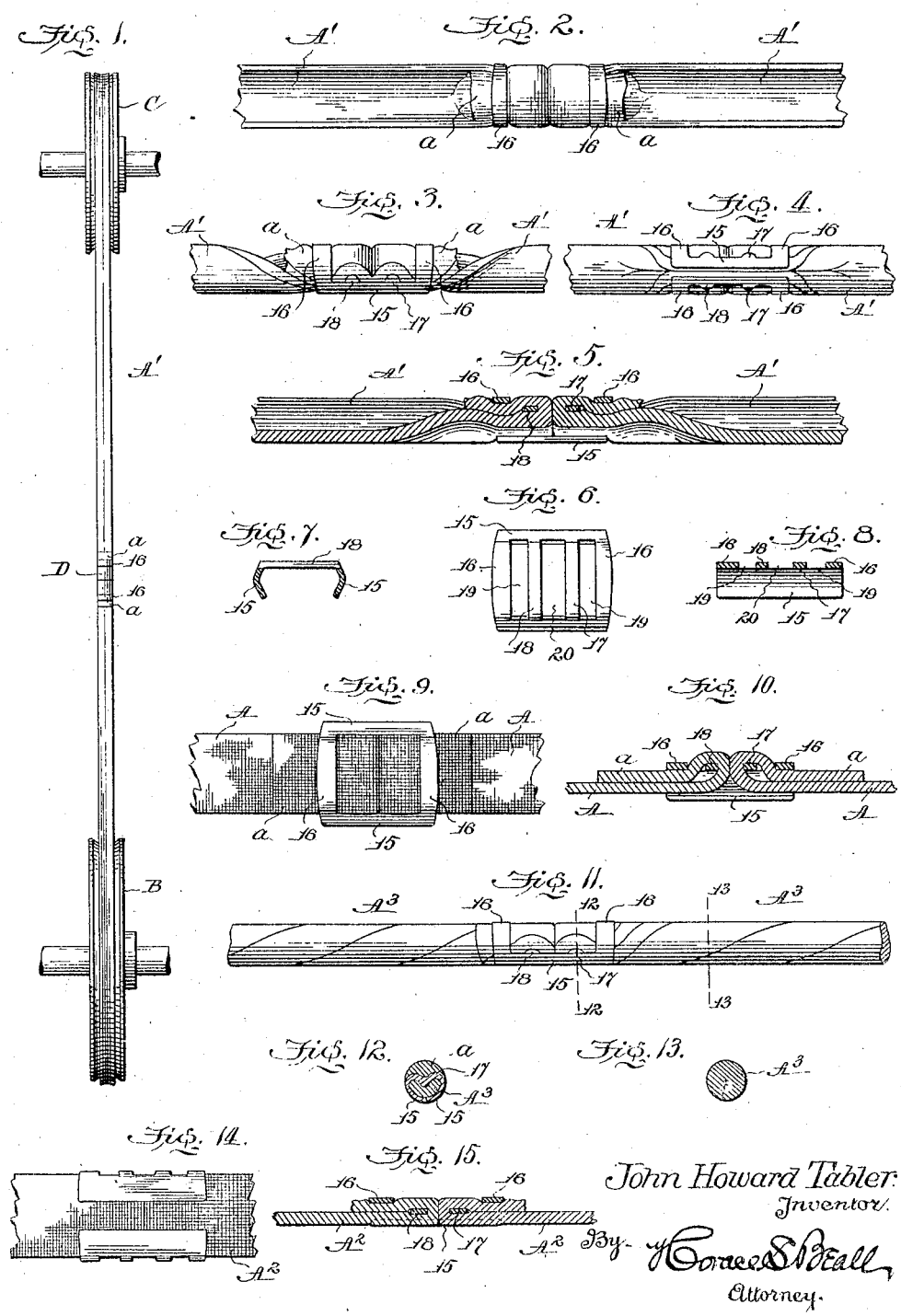

Patented Dec. 11, 1923.

1,476,852

UNITED STATES PATENT OFFICE.

JOHN HOWARD TABLER, OF WASHINGTON, DISTRICT OF COLUMBIA.

BELT FASTENER.

Application filed July 3, 1922, Serial No. 572,411. Renewed May 7, 1923.

*To all whom it may concern:*

Be it known that I, JOHN HOWARD TABLER, a citizen of the United States, residing at Washington, in the District of Columbia, have invented a Belt Fastener, of which the following is a specification.

My invention is an improvement in fastening devices employed for connecting the ends of machine belts, as for instance fan belts used in connection with automobile engines.

The primary object of my invention is to provide a belt fastening device of this character which will be simple in construction, easily applied to permit of an accurate adjustment of the belt between the pulleys before fastening the ends thereof together, and when applied will not interfere with the proper operation of the belt or smooth running of the same on the pulleys.

A further object of my invention is to provide a fastening device which may be advantageously used for connecting the ends of a belt or band made of cotton webbing to thereby provide a cheap, strong and durable fan-belt for automobile engines that is not only inexpensive but may be readily and conveniently applied by an unskilled person.

A further object of my invention is to provide a belt fastening device that will connect the ends of the belt in such manner that both the belt and fastener will operate in grooved pulleys, the belt assuming a shape in cross-section to correspond with the shape of the peripheries of the pulleys over which it runs.

In the drawings:

Fig. 1 is a side elevation illustrating an application of my invention to a belt used in connection with grooved pulleys.

Fig. 2 is an enlarged plan view of the fastening device and belt shown in Fig. 1.

Figs. 3 and 4 are side and bottom views thereof, respectively.

Fig. 5 is a longitudinal sectional view through the fastening device and connected ends of the belt.

Fig. 6 is a detail plan view of the fastening device.

Figs. 7 and 8 are transverse and longitudinal sectional views, respectively, through said fastening device.

Figs. 9 and 10 are plan and sectional views, respectively, to illustrate the manner of threading the ends of the belt in the fastening device preliminary to clamping the parts together.

Fig. 11 shows the application of the fastening device in forming a round belt.

Figs. 12 and 13 are sectional views on the lines 12—12 and 13—13 of Fig. 11.

Fig. 14 shows the device connecting a flat belt.

Fig. 15 is a longitudinal sectional view thereof.

In the drawings I have more particularly illustrated my invention applied to a narrow belt, A, such as used in connection with automobiles, sewing machines, &c., employing grooved pulleys B and C; but as hereinafter explained the device may be used also for connecting the ends of flat belts.

In carrying out my invention the fastening device, D, is formed from malleable metal in any suitable manner, being preferably stamped from sheet metal, and in each instance is of a single piece to present opposite longitudinal side pieces 15 15, cross-pieces 16 16 between the ends of said side pieces, and intermediate cross-pieces 17 and 18 spaced apart and from the end cross-pieces to provide slots 19 19 and 20 through which the ends of the belt are threaded in the manner hereinafter described; the slot 20 being of sufficient width to receive two thicknesses of the belt while the slots 19 19 are narrow for the passage therethrough of a single thickness of said belt. It will be noted that the side pieces depend at substantially right angles from the cross-pieces connected at the upper ends thereof, preferably on a line with each other and that said side pieces are bent outward and inward whereby to facilitate the operation of clamping the device upon the connected ends of the belt.

In applying the fastening device to a belt the ends of the latter are connected in looped engagement with the cross-pieces 17 and 18, respectively, by passing said ends of the belt A up through the slot 20 and out in opposite directions through the slots 19 19, so that the terminal portions *a* will lie between the end cross-pieces 16 and body of the belt, as clearly illustrated in Fig. 10 of the drawings. When the belt is loosely connected to the fastening device in this manner it may be put on the pulleys and adjusted between the same by simply pulling upon either one or both of the terminals *a*, during which operation the belt slides over the cross-pieces 17 and 18 to reduce the length of the belt. The adjustment is securely held by the binding engagement of each pair of cross-pieces on the looped ends of the belt, leaving the hands of the operator free to manipulate the tool for clamping the fastening device more securely upon the belt. For a flat belt $A^2$ the side pieces 15 15 are flattened down against the underside of the belt (see Fig. 14), using an ordinary hammer for the purpose, so that said side pieces will be embedded in the material, and likewise the cross-pieces 16 16 also embedded, with the looped ends of the belt flattened out causing the cross-pieces 17 and 18 to be depressed below the plane of said cross-pieces 16 16, as illustrated in Fig. 5. The belt is thus securely connected and the joint will not interfere with the smooth running of the same over plain pulleys. For a belt $A^1$ to be used in connection with grooved pulleys the fastening device is clamped on the looped ends of the belt so that the joint formed by said fastening device will be substantially round in cross-section, as shown in Figs. 2 to 5, inclusive; the belt being first connected to the opposite ends of the fastening device and adjusted in the manner hereinbefore described and illustrated in Fig. 10. To perform this clamping operation an ordinary pair of pincers having wide curved jaws may be used, and as pincers of this kind are well known an illustration of the same in the drawings is deemed unnecessary. By reference to the drawings it will be noted that when the looped ends of the belt are clamped in the fastening device in this manner the material thereof will be bunched in said fastening device bringing the opposite edges of the belt together (Fig. 4), so that the body of the belt at opposite ends of the fastening device will easily assume practically a V-shape to correspond with the grooves in the pulleys; in other words, the entire belt, including the joint, will properly fit the pulleys so as to run smoothly thereover. By having the side pieces 15 15 of the fastening device curved as hereinbefore described the operation of the pincers in forming a round joint is greatly facilitated, and by applying the required pressure to the handles of the pincers the fastening device will be embedded in the belt and the looped ends of the latter flattened out by depressing the cross-pieces 17 and 18.

Where the arrangement of the pulleys will not permit the belt to be applied after the ends are connected temporarily as shown in Figs. 9 and 10 this connection can be made after passing the belt loosely around the pulleys, as will be readily understood. Thus in renewing a broken belt the new belt can be quickly and conveniently applied, and it will be obvious that it may be applied by an unskilled person with the use of a pair of pincers only.

The device is made of thin metal compared to the thickness of the belt, and the length and width of the slots 19 19 and 20 correspond with the width and thickness of the belt to which the fastening device is applied, it being desirable in each instance to have the belt fit tightly between the ends of the slots so as to insure a good joint.

In Figs. 11, 12 and 13 I have shown how it is practicable to make a solid round belt $A^3$ by the use of my improved belt-fastener, and in this instance the strip of cotton webbing is tightly twisted upon itself from one end of the fastening device to the other. In forming this belt, one end of the material, as cotton webbing, is connected to one end of the fastening device as hereinbefore described and from this connection the strip of material is tightly twisted upon itself for the entire length of the belt, being then pulled upon to tighten the twist, and after the other end is connected to the fastening device the latter is clamped upon and into the material to provide a round joint corresponding substantially with the diameter of the belt. In forming this solid belt the length of the same may be adjusted either on or off the pulleys by pulling on the terminals of the strip after the latter has been twisted upon itself and the ends thereof connected to the opposite ends of the fastening device preliminary to clamping said fastening device to make a secure and solid connection. This solid belt is of peculiar advantage in use in connection with light machinery, such as automobile fan-belts, sewing machines, &c., and when made of cotton webbing provides a cheap belt that is strong and durable as well as possessing a degree of elasticity that will increase the effectiveness of the belt.

As will be obvious the fastening device may be used for connecting a belt in at least three ways—to provide a flat belt, a curved belt, and a solid belt—and in each instance permits of the belt being accurately adjusted between the pulleys. Furthermore, in each instance the material of the belt may be cotton webbing, which is inexpensive and possesses the required strength and durability; but of course other material may be used and connected by the fastening device.

I claim:

1. A belt fastening device of malleable metal comprising side pieces and companion cross-pieces spaced apart between said side pieces at each end of the device, whereby the inner one of each set of companion cross-pieces receive an end of the belt in looped engagement therewith and the side pieces adapted to be upset to clamp said looped end of the belt between the cross-pieces and side pieces.

2. A belt fastening device of malleable metal comprising a series of spaced apart cross-pieces and side pieces depending from the ends of said cross-pieces, said device being adapted to receive the ends of the belt in looped engagement therewith and the side pieces upset to clamp the looped ends of the belt within the device.

3. A belt fastening device of malleable metal comprising a series of spaced apart cross-pieces and side pieces depending from the ends of said cross-pieces, the side pieces being bent outward and inward, whereby the ends of the belt may be connected in looped engagement with the end portions of the device and the side pieces of the latter upset to clamp said looped ends of the belt within the fastening device.

4. In combination with a belt of a malleable metal fastening device connecting the ends thereof comprising longitudinal side pieces and companion cross-pieces at each end of said side pieces over one and under the other of which companion cross-pieces an end of the belt is looped, the metal fastening device and looped ends of the belt therein being clamped together, bending said fastening device and contracting said looped ends of the belt to present a joint substantially round in cross-section, for the purpose set forth.

5. The combination of a strip of material twisted upon itself tightly to provide a solid belt substantially round in cross-section and a fastening device of malleable metal connecting the ends of said belt together comprising side pieces, end cross-pieces, and intermediate cross-pieces, the latter being spaced apart from each other and from the end cross-pieces whereby the ends of the aforesaid belt are connected by looped engagement with the intermediate cross-pieces, respectively, from which said looped ends pass in opposite directions under the end cross-pieces and are securely connected by clamping the fastening device upon and into the same, substantially as herein shown and described.

JOHN HOWARD TABLER.